(No Model.)

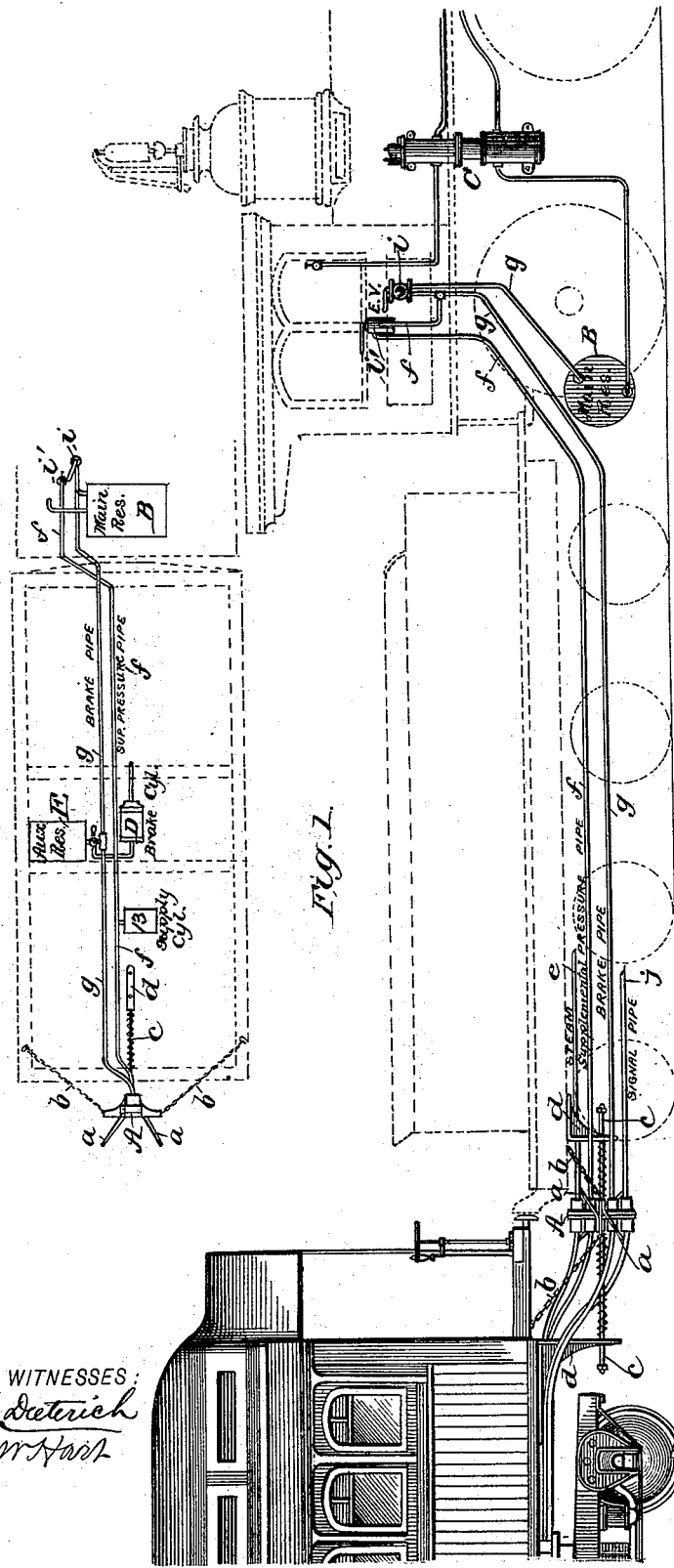

W. A. & B. S. H. HARRIS.
AIR BRAKE COUPLING.

No. 515,219.

3 Sheets—Sheet 2.

Patented Feb. 20, 1894.

WITNESSES:
Fred J. Dieterich
Amos W. Hart

INVENTORS
Wm A. Harris
Benj. S. H. Harris
BY Munn & Co.
ATTORNEYS (No Model.)  
3 Sheets—Sheet 3.
W. A. & B. S. H. HARRIS.
AIR BRAKE COUPLING.
No. 515,219. Patented Feb. 20, 1894.
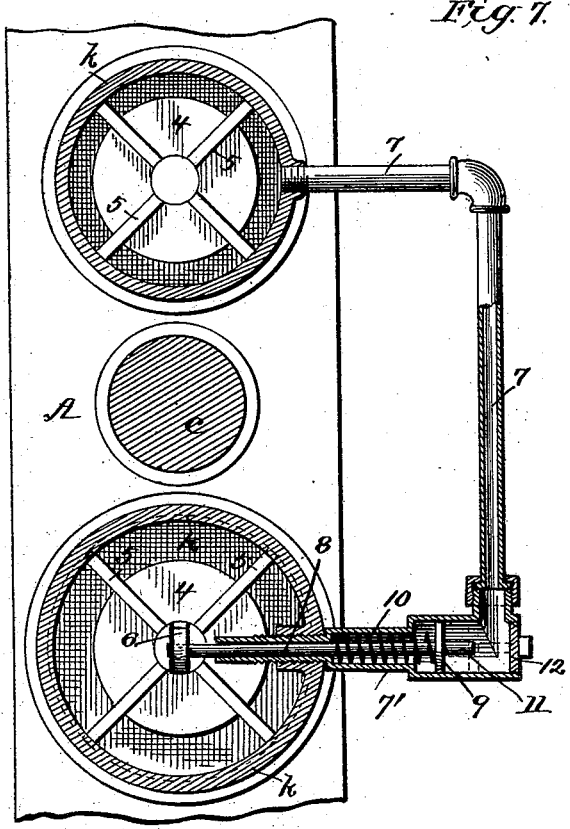
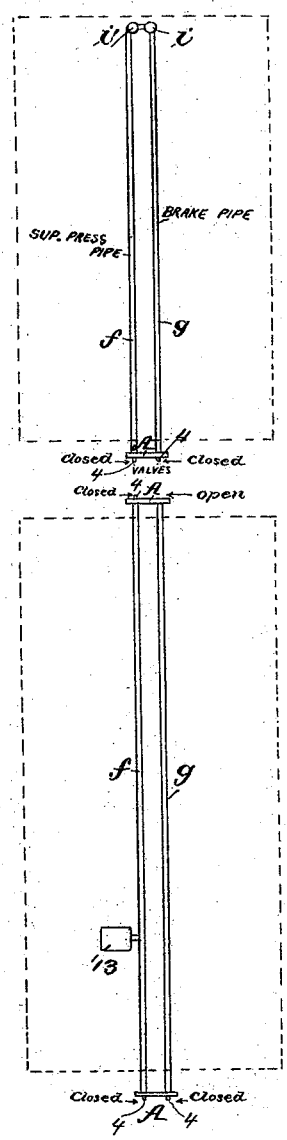
WITNESSES:
INVENTORS  
W<sup>m</sup> A. Harris,  
Benj. S. H. Harris  
BY  
ATTORNEYS

UNITED STATES PATENT OFFICE.

WILLIAM A. HARRIS AND BENJAMIN S. H. HARRIS, OF PELZER, SOUTH CAROLINA.

AIR-BRAKE COUPLING.

SPECIFICATION forming part of Letters Patent No. 515,219, dated February 20, 1894.

Application filed April 3, 1893. Serial No. 468,856. (No model.)

*To all whom it may concern:*

Be it known that we, WILLIAM A. HARRIS and BENJAMIN S. H. HARRIS, residing at Pelzer, Anderson county, in the State of South Carolina, have invented a new and useful Improvement in Air-Brake Couplings, of which the following is a specification.

We have devised and practically tested new and improved automatic pipe couplings adapted for use as parts of the Westinghouse and allied systems of air brakes; and have made the same subjects of applications for Letters Patent, serially numbered respectively 436,266 and 458,511. The main feature of those inventions is the provision of coupling heads containing self-acting valves and mechanism for locking them, in connection with a supplemental air-pressure pipe extending from the locomotive cab alongside the brake-pipe, throughout a train, whereby the brake-pipe sections attached to different cars are adapted to couple and uncouple automatically, when such cars come together, also whereby, in case of accidental parting of two or more cars, when a train is running, the brakes will be instantly applied, automatically not only to the individual cars thus separated, but to others that may remain connected with the locomotive; also, whereby the valves of the brake-pipe couplings may be closed at will by the engineer, through the manipulation of a valve in the cab, thus preventing the application of the brakes whenever desired, as for example, when making up a train or shifting cars from one to another. In other words, our system of automatic pipe coupling described in said applications embodies as its leading or distinguishing features not only peculiar valve mechanism, but an air-pressure pipe which is supplemental to the brake-pipe, and to which air is admitted from the latter, or directly from the main reservoir, and from which it may be discharged at will by the engineer for the purpose of operating the valve-locking mechanism.

Our present invention is an improvement in this line, and embodies a new valve-locking and releasing mechanism, whereby certain important advantages are obtained in the automatic application and release of brakes, as hereinafter set forth.

Figure 3:
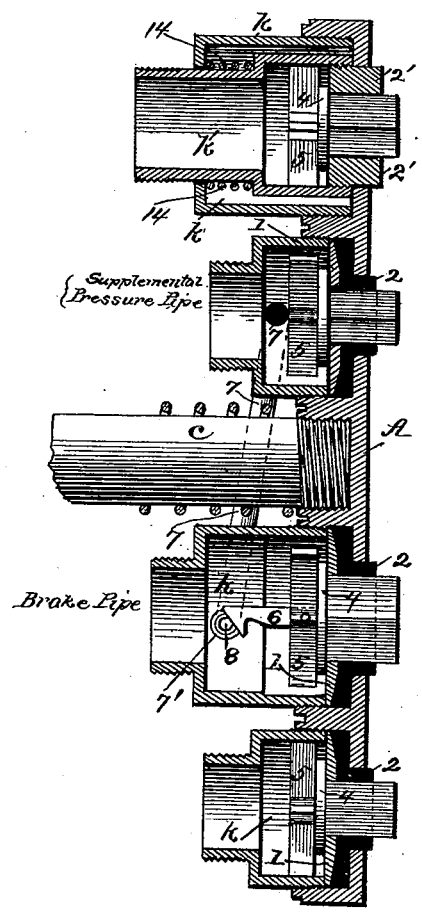
Figure 4:
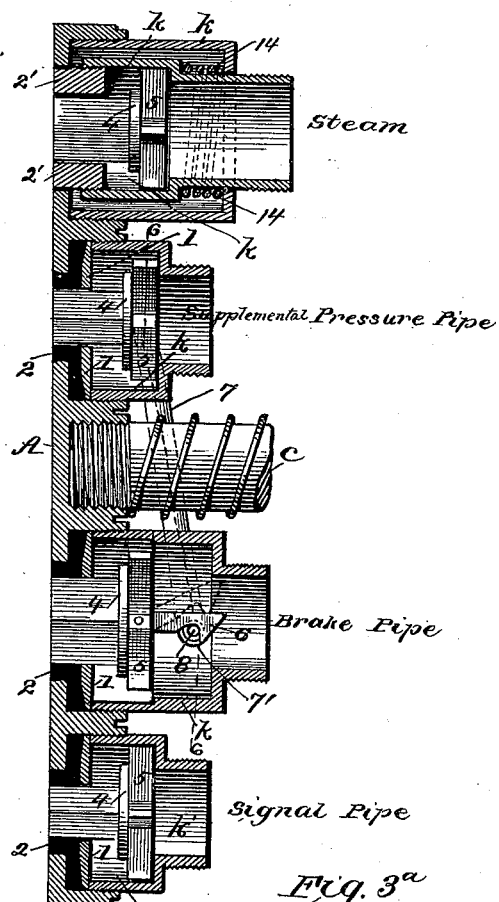
Figure 5:
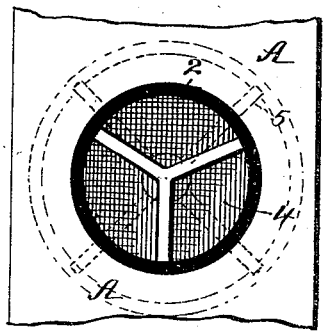
Figure 3A:
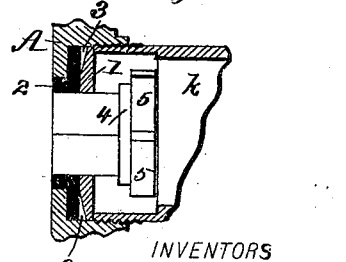

In the accompanying drawings (three sheets) Figure 1 is a side view showing our invention applied to a locomotive tender, and car. Fig. 2 is a bottom plan—partly diagrammatic—showing our invention applied to a car. Fig. 3ª shows a detail. Fig. 3 is a central vertical section of one of our coupling heads, showing the automatic valves closed. Fig. 4 is a central section of a coupling head, showing the same valves open, that is to say, in the position they are held in when two coupling heads are engaged as shown in Fig. 1. Fig. 5 is a face view of a portion of a coupling head, showing a valve opening and valve. Fig. 6 is a vertical section (enlarged) on line 6—6 of Fig. 4. Fig. 7 is a diagrammatic view illustrating the action of our system when a train is parted.

The coupling heads A, A (Figs. 1, 3 and 4) employed in this instance are constructed and supported substantially like those shown and described in our former applications before referred to. That is to say, the coupling heads are oblong metal plates, having flat contact faces, and provided with valved openings, corresponding in number with the several pipes required to be attached to them, and having divergent arms, $a$ (Fig. 1), for guiding them into and holding them in proper engagement with other heads on other cars, and they are supported by chains, $b$, arranged at a suitable angle, and a spring-encircled rod, $c$, which is adapted to slide in right-angular brackets, or hangers, $d$, pendent from the car. There are four valved openings in each head (Figs. 3, and 4), and four connecting pipes (Fig. 1), to wit: a steam pipe, $e$, for supplying heat to the cars, the supplemental air-pressure pipe, $f$, and the brake or train pipe $g$, and the signal pipe $j$. The steam pipe coupling—shown in Figs. 3 and 4—will be described hereinafter. The signal pipe coupling and its valve (Figs. 3 and 4) are a duplicate of the same parts applied to the supplemental pressure pipe, and hence require no separate description. We therefore proceed to described the leading feature of the invention, namely the valves and valve-locking mechanism of the supplemental pressure pipe and brake pipe, together with other parts necessarily connected therewith to form an operative brake system.

The main air reservoir, B, (Fig. 1,) is located beneath the locomotive and supplied by an air pump, C, in the usual way. The usual brake or train pipe, g, is connected with such main reservoir, B, and extends into the cab of the locomotive, where it is provided with the so-called engineer's valve.

The tender and cars are each provided with a brake cylinder, D, triple valve (not shown), and auxiliary reservoir, E, and the brake-pipe, g, is connected with the latter, and the piston of the brake-cylinder is connected with the brakes proper (not shown) on both the tender and cars. Thus far we have described the parts and arrangement of parts usually employed in the Westinghouse system. Alongside the brake-pipe g, beneath the locomotive tender and cars, is arranged the supplemental air pressure pipe, f, and both are connected with the coupling heads A, A, at the rear end of the tender and also at both ends of each car (Figs. 1 and 2). This supplemental pressure pipe, f, is connected directly with the brake-pipe, g, at a point near the engineer's valve i, and is provided with a separate three-way valve, i', which is located in the cab contiguous to the engineer's valve, as shown in Fig. 1. This valve i' is described and illustrated in our former application, Serial No. 458,511. The supplemental pipe, f, and brake-pipe, g, are connected with each coupling head, A, at points respectively above and below the horizontal rod, c. As in our former inventions, these pipes f, g, are attached to nipples formed on the rear ends of hollow cylinders, k, which are screwed into sockets formed in the coupling heads A. All the cylinders, k, save those to which the steam pipes are coupled abut and hold in place metal (brass) washers, 1, which seat against the radial, annular flanges of rubber gaskets, 2. Instead of the latter being T-shaped in longitudinal section, as in our former inventions, they are made L-shaped, and the washer, 1, bears against the entire width of their inner sides. The washers are beveled on the side adjacent to the gaskets 2, thus providing an annular space 3 as shown in Fig. 3ª. The gaskets expand into this space when the washers are forced against them by screwing the cylinders, k, into their sockets, and such expansion is shown in Figs. 3 and 4. But for the annular space referred to, the expansion of the gaskets, 2, due to compression, would be wholly inward or toward their centers, thereby forming an irregular and undesirable internal projection to work in contact with the stems of the sliding valves, 4. The valve proper, or valve disk, 4, seats upon the washer, 1, as before; but, instead of being made the full diameter of the chamber of the cylinder, k, in which it works, and being provided with openings for passage of air, or steam, we make it much narrower so that a wide annular space exists between its periphery and the adjacent side of the chamber. For the purpose of supporting and guiding the valve, 4, horizontally, as required, we provide them with radial arms, 5 (Figs. 3, 4, and 6)—preferably four in number—which are attached to the back of the valve and whose outer ends work in easy frictional contact with the inner side of the enlarged portion of the chamber, k. It is apparent that the fluid—air or steam—has practically free passage past the valves proper, 4, and the guide-arms, 5, so that the valve may operate with maximum ease and rapidity.

We will now describe the new and improved means we have devised for locking and releasing the coupling valve of the brake-pipe, g. As in our previous inventions, the said valve is provided with a pivoted catch, 6, whose beveled free end is adapted to rise from, but cannot fall below, the horizontal position. A small pipe, 7, (Figs. 3, 4, and 6) extends from the valve chamber, or cylinder, k, of the supplemental pressure-pipe to that of the brake-pipe, g. The points of attachments of the ends, or terminals, of this pipe are on the sides of such cylinders, at or near the middle of the latter, and hence in rear of the valves, 4. The pipe, 7, is shown made in sections connected by suitable joints, but the manner of attachment to the cylinders, k, may be varied. In this instance the pipe terminals are screwed into threaded bores in the cylinders k. The lower section, 7', of said pipe is provided with three bores, or chambers, of different diameters, and a rod, 8, having an enlarged disk-like head, 9 which serves as a piston, against which the air pressure in the supplemental pipe, f, acts, as hereinafter described, is adapted to slide in said section and to engage with the pivoted valve-catch 6, so as to temporarily lock the valve open, as will be hereinafter more fully described. The rod, 8, fits snugly in the smallest portion of the pipe section, 7', and the piston, 9, also fits and slides in the largest portion of the same. Between the piston and inner end of the middle chamber, is arranged a spring, 10, which is coiled about the rod, 8. A lug, 11, projects from the piston, 9, and serves to preserve a space between the latter and outer end, 12, of the pipe section, 7', so that air may always have access to the piston. The said end, 12, of the pipe section, 7', is a removable screw-plug, which enables the lock rod and spring to be readily inserted in place, or new ones substituted if required. When the pipes of different cars are coupled, their valves are forced back, and, air pressure being admitted to the supplemental pressure pipe, the pistons 9 are driven forward to lock the valves in such open position, thus preventing them from closing when the pipes uncouple. On the other hand, it is obvious that when air pressure is duly relieved in the supplemental pipe, f, and its connecting pipe, 7, the resiliency of the spring, 10, will withdraw the rod 8, from such engagement with the catch, 6, and allow the valve to close on its seat.

As shown in Fig. 2, a small air-supply cylinder 13 is connected with the supplemental pressure pipe, for a purpose hereinafter stated.

When a train is being made up, the valve, $i'$, of the pipe, $f$, is closed, so that no air pressure exists in the latter and therefore all the valve-locking rods, 8, are held retracted by the springs, 10, and cannot engage with the valve catches, 6. When the train has been made up, however, air pressure is applied throughout the same, and is also equal and uniform in the main reservoir, the supplemental pipe, $f$, and the brake-pipe, $g$, since the valves 4 of said pipes—save only those at the rear end of the rear car—are then held open by reason of the contact and pressure of opposite coupling heads and valves (Figs. 1 and 4).

In case the train parts when running—as shown in the diagrammatic view, Fig. 7—the following operation and results ensue: First, the previously open valve, 4, at the front end of the supplemental pressure pipe, $f$, of the car or cars which have broken away closes instantly, by reason of the air pressure behind it, thus cutting off escape of air from such pipe, so that the pressure on the pistons, 9, of the valve-locking rods, 8, of such car or cars is not reduced sufficiently to permit their springs, 10, to retract them and thus release the valves of the brake-pipe, $g$. The obvious consequences are that the air pressure in the brake-pipe on the broken-away car or cars is entirely removed, and the brakes are therefore not only applied but kept applied until the said car or cars are again coupled with the rest of the train and a due degree of air pressure is again restored in the brake-pipe. In the second place, while the brakes of the broken-away car or cars are thus kept on, those of the rest of the train are soon released. That is to say, when the train is parted, the valve at the rear end of the supplemental-pressure pipe, $f$ (on the front section of the train) instantly closes, automatically, by reason of air pressure thereon, but the corresponding and opposite valve of the brake pipe, $g$, is held open a few seconds by the locking-rod, 8, (see Fig. 7,) and then closes, so that the brakes are released. In other words, owing to the connection of the supplemental pressure pipe, $f$, with the brake pipe, $g$, when a "break," or parting of train couplings occurs, air is "bled" or drawn off from both of said pipes, and the following results ensue: first, the brakes are applied as usual upon reduction of pressure in the brake-pipe; next, the valve at the rear end of the brake-pipe is quickly unlocked, and thus closes, which allows restoration of air pressure in the brake-pipe and release of the brakes. On the other hand, there being no air communication between the brake-pipe and supplemental pressure pipe on the rear or parted portion of the train, the air pressure on the pistons, or heads, of the valve-locking rods is maintained, and hence the previously open brake-pipe valve is prevented from closing, which results in keeping the brakes on. If a train should part slowly, the valve 4 of the supplemental pressure pipe at the front end of the rear or broken away section could not close instantly, and hence the air might be "bled" off from said pipe sufficiently to reduce the pressure therein below the tension of the spring 10, thus unlocking the brake-pipe valve and releasing the brakes. To prevent this result, we provide an air-supply cylinder 13, of moderate dimensions, which practically enlarges to that extent the capacity of the supplemental pressure pipe with which it is connected.

As shown in Figs. 3 and 4, the cylinder $k'$, to which the steam-heating pipe, $e$, (Fig. 1,) is attached, is adapted to slide within the fixed cylinder, $k$, and a coiled spring 14, is interposed between them. An annular, brass, packing-ring, $2'$, is screwed into the front end of such slidable cylinder, $k'$, and works, i. e. slides, in the orifice in the face of the coupling head, A. The ring, $2'$, normally projects as shown in Fig. 3, but, when two coupling-heads, A A, meet, the rings, $2'$, and cylinders, $k'$, are forced back, thus compressing the springs, 14, which thereafter hold the rings in steam-tight contact. It is obvious that when the coupling heads part, the valves 4, which work in the cylinders, $k'$, will cut off escape of steam and the springs 14, force the rings, $2'$, and the cylinders, $k'$, back to their normal position.

What we claim is—

1. In an air brake, the combination, with the brake-pipe, supplemental-pressure pipe, a coupling head, hollow cylinders attached to said head coincidently with orifices therein, and automatic valves for opening and closing said pipes, of a tube which connects said cylinders and is in open communication with the supplemental-pressure pipe and a spring actuated rod having a piston inclosed in said tube, and adapted to slide in said tube, to lock and unlock the valve of the brake-pipe, substantially as shown and described.

2. In an air brake, the combination, with the brake-pipe and supplemental-pressure pipe, a coupling head, automatic valves arranged in the latter, a tube connecting said pipes, a spring-actuated valve-locking rod arranged in a straight section of said tube and having a piston inclosed in said tube, and means for limiting the retractile movement of the rod and for maintaining a space between the piston and end of the tube section, whereby the air in the supplemental-pressure pipe may always have free access to the outer side of the piston, as shown and described.

3. In an air brake, the combination, with coupling heads having orifices for passage of air, valves adapted to open or close such orifices, the brake-pipe and supplemental pressure pipe connected at their front ends and with said heads coincidently with their orifices, tubes which connect said pipes adjacent to said heads, valve-locking, spring-retracted rods arranged in a portion of the tubes and having a piston as specified, and adapted to engage a device forming an attachment of the brake-pipe valves, and the valves $i$ and $i'$ substantially as shown and described, whereby, in case a train parts, air is "bled" from both the brake pipe and supplemental-pressure pipe on the front portion of the train, thus momentarily applying the brakes thereto, then allowing their release, while the brakes on the rear, or broken-away, portion of the train are kept on, as specified.

WILLIAM A. HARRIS.
BENJAMIN S. H. HARRIS.

Witnesses:
 AMOS W. HART,
 SOLON C. KEMON.